United States Patent
Tamura

(10) Patent No.: US 8,270,046 B2
(45) Date of Patent: Sep. 18, 2012

(54) IMAGE PROCESSOR AND IMAGE PROCESSING METHOD FOR EXTRACTING REMOVAL COLOR AND COLOR AROUND REMOVAL COLOR IN AN IMAGE PRIOR TO IMAGE COLOR/MONOCHROME DETERMINATION

(75) Inventor: Hirokazu Tamura, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 12/247,334

(22) Filed: Oct. 8, 2008

(65) Prior Publication Data
US 2009/0097072 A1    Apr. 16, 2009

(30) Foreign Application Priority Data
Oct. 12, 2007    (JP) ................. 2007-266702

(51) Int. Cl.
*H04N 1/46* (2006.01)
(52) U.S. Cl. ........ 358/500; 358/530; 358/515; 358/522; 358/3.01; 382/168
(58) Field of Classification Search ............. 358/3.1
See application file for complete search history.

(56) References Cited

U.S. PATENT DOCUMENTS

| | | | | |
|---|---|---|---|---|
| 5,177,603 A * | 1/1993 | Kojima | ........... | 358/518 |
| 5,289,296 A | 2/1994 | Yamada | ........... | 358/530 |
| 5,786,906 A * | 7/1998 | Shishizuka | ........... | 358/500 |
| 2006/0222240 A1* | 10/2006 | Hirota et al. | ........... | 382/162 |

FOREIGN PATENT DOCUMENTS

| | | |
|---|---|---|
| EP | 0448330 | 9/1991 |
| JP | 4-90258 | 3/1992 |
| JP | 04-090675 | 3/1992 |

OTHER PUBLICATIONS

European Search Report dated May 19, 2010 in EP 08166263.7.
Chinese Office Action dated Aug. 3, 2010 in corresponding Chinese Application No. 200810168273.1.

* cited by examiner

*Primary Examiner* — Twyler Haskins
*Assistant Examiner* — Christopher D Wait
(74) *Attorney, Agent, or Firm* — Fitzpatrick, Cella, Harper & Scinto

(57) ABSTRACT

An object of the present invention is to provide an image processor capable of generating an image from which a user-designated color component has been removed and performing a color/monochrome determination correctly. In order to complete the task, an image processor according to the present invention comprises a removal unit that removes a removal color part from a read image, and a determination unit that determines whether the read image from which the removal color part has been removed by the removal unit is a monochrome image or a color image.

8 Claims, 3 Drawing Sheets

IMAGE PROCESSOR AND IMAGE PROCESSING METHOD FOR EXTRACTING REMOVAL COLOR AND COLOR AROUND REMOVAL COLOR IN AN IMAGE PRIOR TO IMAGE COLOR/MONOCHROME DETERMINATION

BACKGROUND OF THE INVENTION

1. Field of the Invention

The present invention relates to an image processor and an image processing method having a function capable of copying, transmitting, etc. of a read image while removing a user-designated color component from the read image, and also an automatic color/monochrome (black-and-white) determination function.

2. Description of the Related Art

Conventionally, a technology of determining whether a read image obtained by scanning a manuscript is a color image or a monochrome (black-and-white) image like a technology disclosed in Japanese Patent Laid-Open No. 04-90675 has been known. In addition, it is also described in Japanese Patent Laid-Open No. 04-90675 that pixels of a user-designated color of a read image are forcibly converted to gray pixels and then it is determined whether the read image is a color image or a monochrome image.

In the technology disclosed in Japanese Patent Laid-Open No. 04-90675, when a manuscript including a handwritten character or a ruled line of a user-designated color exists in a monochrome manuscript and when the color of the handwritten character or the color of the ruled line is designated as the designated color, the following processing is performed.

First, a monochrome manuscript including a handwritten character (for example, a character written with a ballpoint pen in the manuscript) or a ruled line of the designated color is scanned to form a read image. Then, the handwritten character and ruled line of the read image are forcibly converted to gray, and it is determined that the read image is a monochrome image.

However, a technology according to Japanese Patent Laid-Open No. 04-90675 is not able to remove the designated color from the read image.

Thus, the handwritten character and ruled line of the designated color have not been able to be removed from the read image.

SUMMARY OF THE INVENTION

In order to solve the above problem, an image processor according to the present invention includes a removal unit removing the part of the image that is of a removal color from a read image and a determination unit determining whether the read image from which the removal color part has been removed by the removal unit is a monochrome image or a color image.

By the present invention, an image from which a user-designated color component has been removed can be generated and color/monochrome determination can be performed accurately.

In this way, for example, it is possible to remove annotations when making a copy of a document, thus enabling a user to obtain an equivalent of a copy of an original document, even if annotations have been made on the original document.

In an embodiment of the present invention, colors around the designated color are also removed. In one embodiment, colors around the designated color means colors with an HSL value having no substantial difference in any of the H, S and L values to the HSL value of the designated color.

Further features of the present invention will become apparent from the following description of exemplary embodiments (with reference to the attached drawings).

DESCRIPTION OF THE EMBODIMENTS

Image processing of embodiments of the present invention will be described in detail below with reference to the drawings. In the following description, a digital multi-function peripheral machine is assumed to be an image forming apparatus. However, any other printing device such as a color copying machine or a color printer, or a reading apparatus can also be considered as an image forming apparatus.

First Embodiment

Image Forming Apparatus

Figure 1:
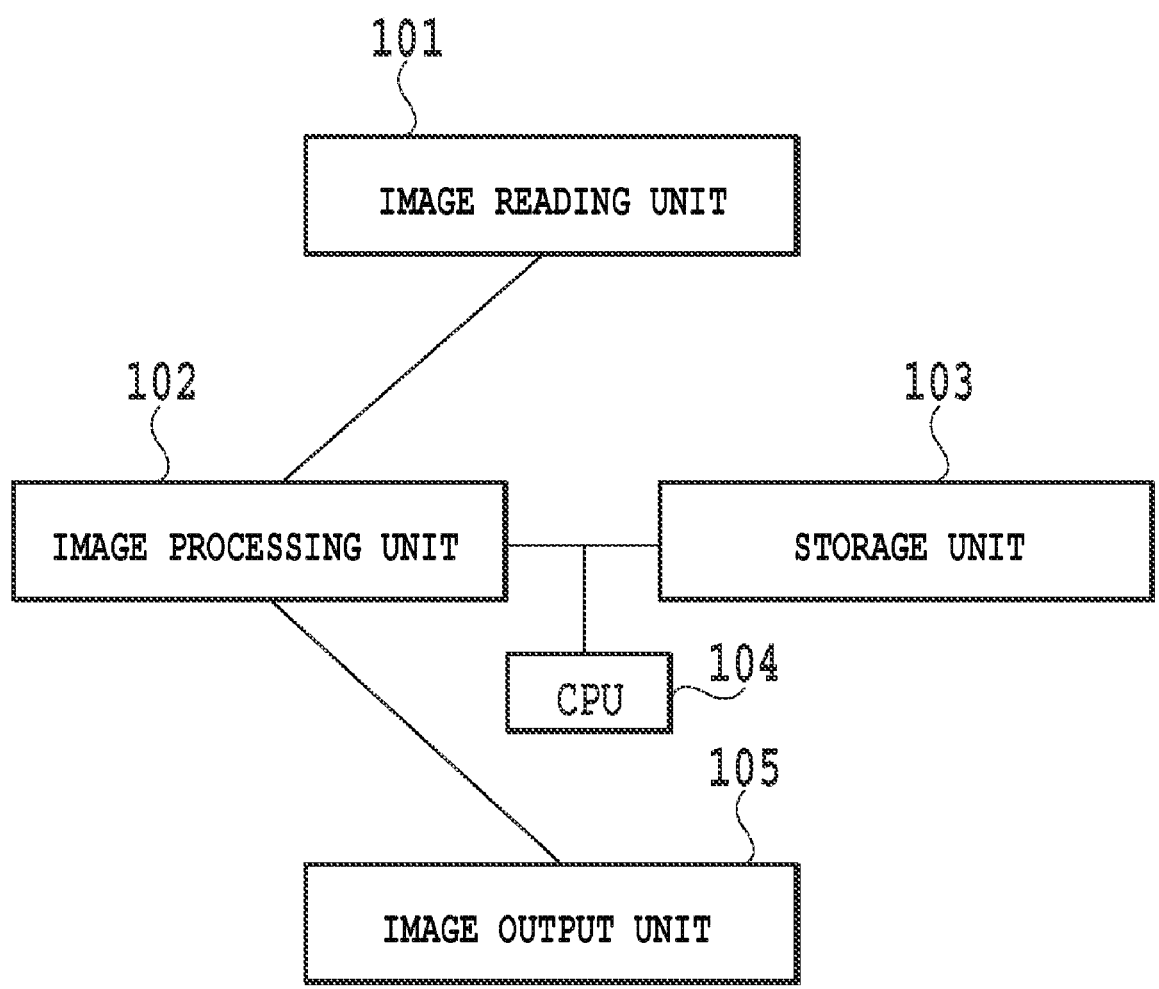
FIG. 1 shows an image forming apparatus according to the present invention.

FIG. 1 is a block diagram of an image forming apparatus of this embodiment.

As shown in FIG. 1, the image forming apparatus has an image reading unit 101, an image processor (an image processing unit 102, a storage unit 103, and a CPU 104), and an image output unit 105. The image forming apparatus can be connected to a server managing image data, a personal computer (PC) instructing print execution, etc. through a network, etc.

The image reading unit 101 reads an image of a manuscript and outputs image data.

The image processing unit 102 converts print information including image data input from the image reading unit 101 or the outside into intermediate information (referred to as an object hereinafter) and stores the object into the object buffer of the storage unit 103. At that time, the image processing unit 102 performs image processing such as density correction. In addition, the image processing unit 102 generates bitmap data on the basis of the buffered object and stores the bitmap data into the band buffer of the storage unit 103. At that time, the image processing unit 102 performs half-tone processing such as dithering.

The storage unit 103 includes a ROM, a RAM, and a hard disk (HD). The ROM stores various kinds of control programs and image processing programs executed by the CPU 104. The RAM is used as a reference area and a work area into which the CPU 104 stores data and various kinds of information. Furthermore, the RAM and the HD are used as the object buffer, the band buffer, etc.

The image output unit 105 forms and outputs a color image on a recording medium such as a recording paper.

[Outline of Image Forming Apparatus]

Figure 2:
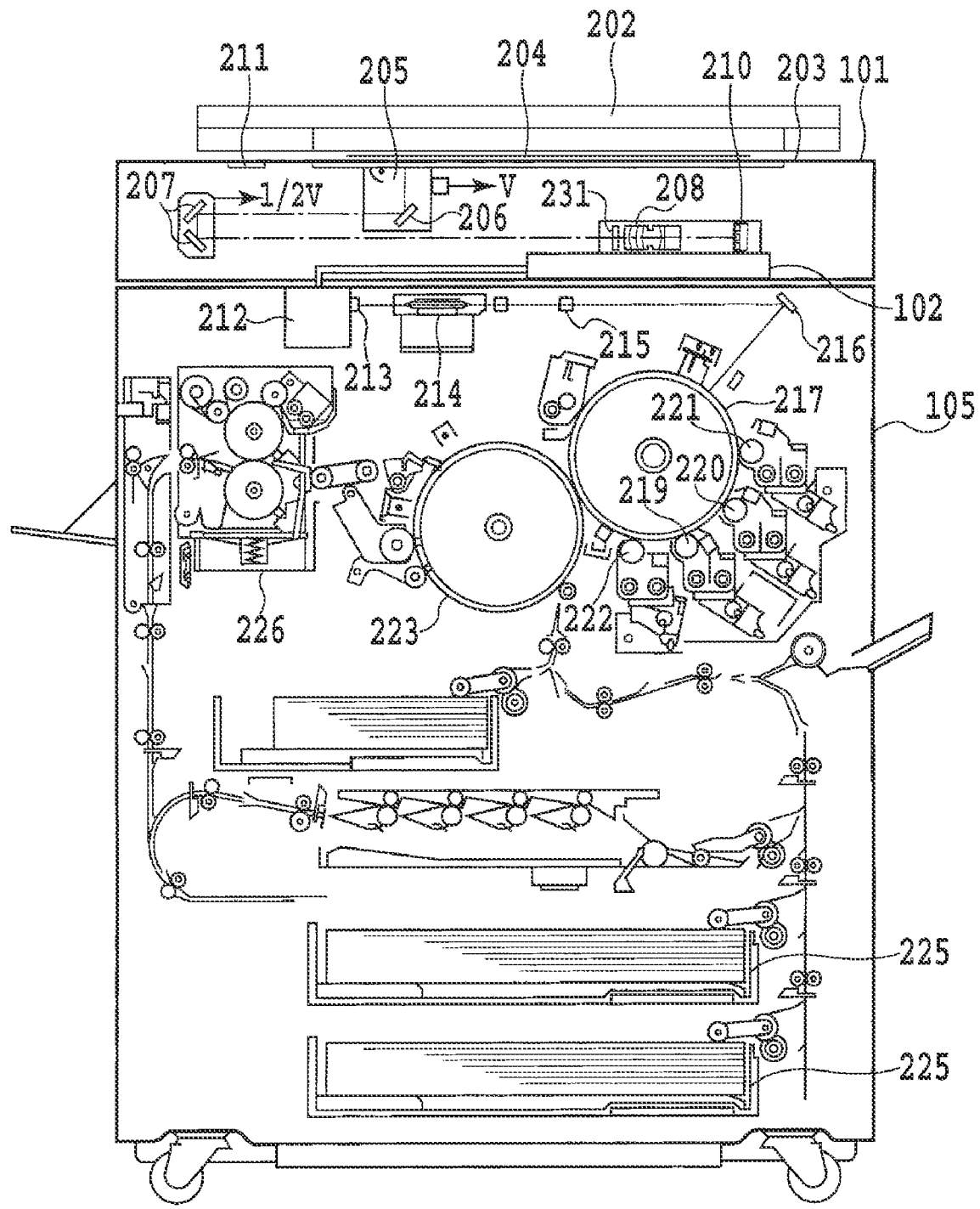
FIG. 2 shows an image forming apparatus according to the present invention.

FIG. 2 is an outline view of the image forming apparatus.

In the image reading unit 101, a manuscript 204 to be imaged is placed between a manuscript glass plate 203 and a manuscript platen 202, and the manuscript 204 is irradiated with the light of a lamp 205. Reflected light from the manuscript 204 is guided to mirrors 206 and 207, and an image is formed on a three-line sensor 210 by a lens 208. The lens 208 is provided with an infrared cut filter 231. A mirror unit including the mirror 206 and the lamp 205 is moved at the speed of V in the direction of an arrow shown in FIG. 2, and a mirror unit including the mirror 207 is moved at the speed of V/2 in the direction of a respective arrow, by a motor not shown in the figure. In other words, the mirror units are moved in a direction (sub-scanning direction) perpendicular to the electric scanning direction (main scanning direction) of the three-line sensor 210 to scan the entire manuscript 204.

The three-line sensor 210 including three lines of CCDs color-separates input optical information to read each of color components of full color information: red R, green G, and blue B, and sends the color component signals to the image processing unit 102. Note that, each of the CCDs included in the three-line sensor 210 has light-receiving elements for 5000 pixels, and is able to read a manuscript of A3 size which is the maximum size of a manuscript capable of being placed on the manuscript glass plate 203 in the lateral direction (297 mm) at a resolution of 600 dpi.

A standard white plate 211 is used to correct data which has been read by the three-line sensor 210. The standard white plate 211 is white indicating an almost uniform reflection characteristic in visible light.

The image processing unit 102 electrically processes image signals input from the three-line sensor 210 to generate color component signals of magenta M, cyan C, yellow Y, and black K, and sends the generated color component signals of MCYK to the image output unit 105.

At that time, device-dependent RGB signals which have been read by the three-line sensor 210 are color-converted to device-independent RGB signals which have absorbed the device characteristic. Then, a removal color is removed. Here, to remove the removal color is to whiten a part of the image that is of a removal color. Subsequently, color determination processing is performed and the RGB color components are converted to CMYK color components.

Here, the removal colors include a user-designated color and colors around the designated color.

In the image output unit 105, an image signal of M, C, Y, or K sent from the image reading unit 101 is sent to a laser driver 212. The laser driver 212 modulates and drives a semiconductor laser element 213 according to an input image signal. A laser beam output from the semiconductor laser element 213 scans a photosensitive drum 217 through a polygon mirror 214, an f-θ lens 215, and a mirror 216 to form an electrostatic latent image on the photosensitive drum 217.

A developing device includes a magenta developing device 219, a cyan developing device 220, a yellow developing device 221, and a black developing device 222. The four developing devices consecutively make contact with the photosensitive drum 217, thereby developing the electrostatic latent image formed on the photosensitive drum 217 with a corresponding color toner to form a toner image. A recording paper supplied from a recording paper cassette 225 is wound around a transfer drum 223 and the toner image on the photosensitive drum 217 is transferred onto the recording paper.

The recording paper onto which toner images of four colors of M, C, Y, and K have been sequentially transferred in this way is passed through a fixing unit 226, where the toner images are fixed and the recording paper is then discharged outside the apparatus.

Processing of converting device-dependent RGB signals to device-independent RGB signals, color removal, and performing color/monochrome determination is described with reference to FIG. 3.

Figure 3:
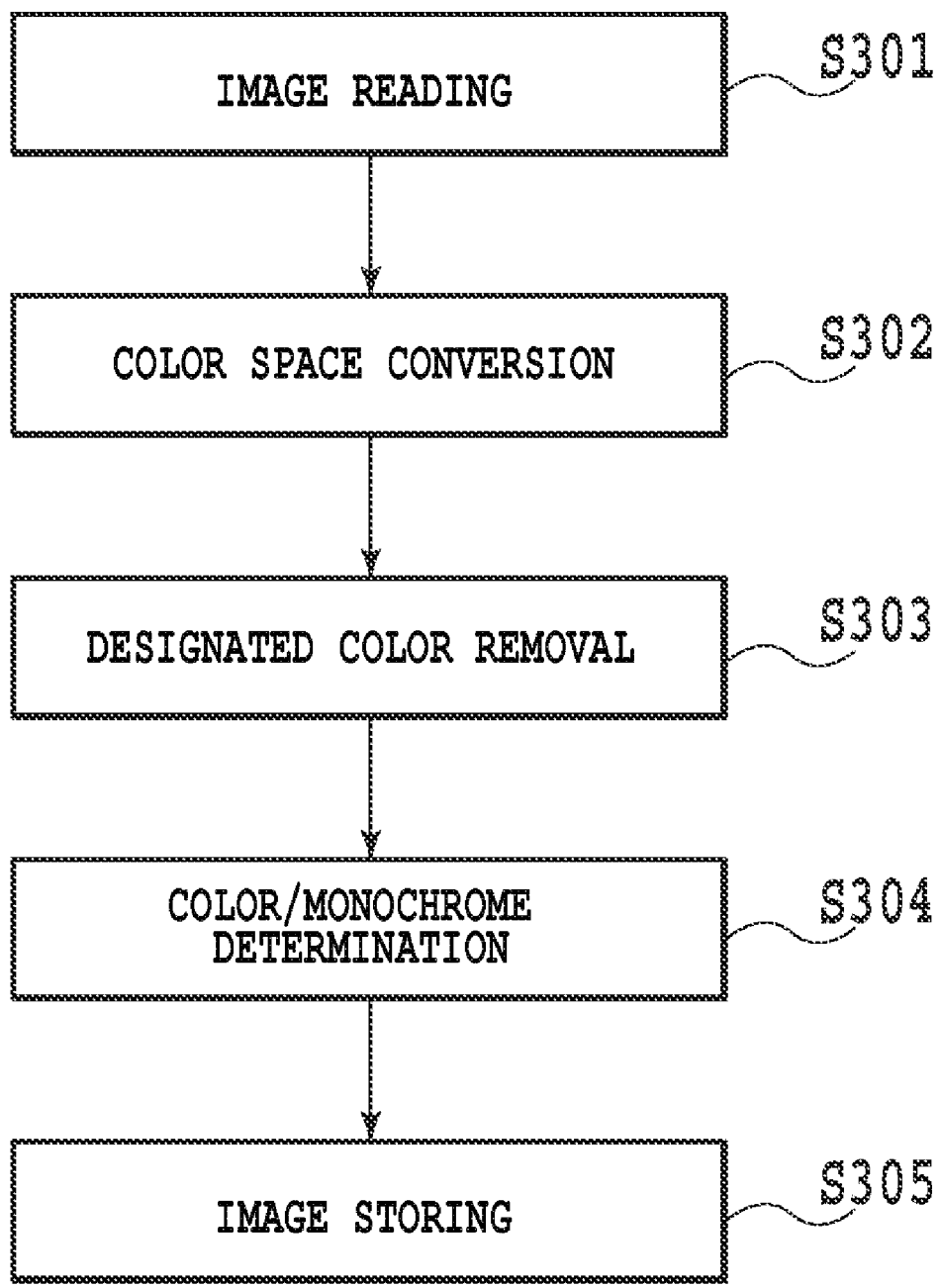
FIG. 3 shows blocks of processing according to the present invention.

Processing shown in FIG. 3 is executed entirely by the image processor.

First, in step S301, a reading device reads a manuscript and generates Ra, Ga, and Ba signals. The Ra, Ga, and Ba signals have characteristics depending on the reading device and are signals in the state of having no meaning as a color system defined by the CIE (Commission Internationale d'Eclairage).

After that, in step S302, the Ra, Ga, and Ba signals are converted to Ra', Ga', and Ba' signals in a color space related to a color system defined by the CIE, that is, a device-independent color space, by color space conversion.

Subsequently, in step S303, designated color removal processing is performed. In this processing, a user-designated specific color component in the image is extracted and the pixels thereof are replaced with white pixels.

After that, in step S304, color/monochrome determination is performed, and it is determined whether the image has a color component or not. It is determined that the image is a color image when the image has color components not less than a fixed amount, while it is determined that the image is a monochrome image when the image has color components less than the fixed amount.

In step S305, the image is stored in a memory device. The memory device may be, for example, a hard disk (HD).

When it is determined that the image is a monochrome image in step S304, the image is printed using a K toner only, after monochrome conversion. Consequently, the printing speed and the toner cost become lower than those of a color image.

Furthermore, in step S304, when the image is transmitted in the case that it has been determined that the image is a monochrome image, the image is compressed and transmitted after monochrome conversion, and thereby the transmission speed becomes higher than that of a color image.

Designated color removal performed in step S303 and color/monochrome determination performed in step S304 are described in detail below.

First, the operating unit of the image forming apparatus accepts the selection of a color which a user wants to remove and which is selected by the user. The operating unit indicates typical colors such as red, yellow, green, cyan, blue, and magenta as buttons, and allows a user to select a color which the user wants to remove from among the typical colors. At that time, when two or more colors are selected at the same time by the user, a wide range of colors are designated as removal colors. Furthermore, when all of the colors indicated by the operating unit are selected by the user, all chromatic colors may be designated as removal colors.

Subsequently, for an RGB image to which image reading and color space conversion have been performed, color conversion to the HSL space is performed. The HSL space has been separated as a color space of hue, saturation, and luminance, and can be converted to the RGB space and vice versa. Color representation by the HSL space matches human color vision more than color representation by the RGB space and is especially effective in numerically expressing a user-designated color. Usually, a hue value H is expressed as an angle, and the above user-designated color is also mapped to a hue value H.

Subsequently, the image converted into the HSL space is compared with thresholds, designated color determination is performed, and whitening is performed. When the hue value of a color is in a threshold range of a user-designated hue value $\pm T_H$, the saturation value of the color is a fixed threshold $T_S$ or more, and the luminance value of the color is greater than or equal to $T_{L1}$ and less than or equal to $T_{L2}$, it is determined that the color is a designated color. When it is determined that the color is a designated color, the color is whitened by replacing the saturation and luminance of the color with 0 (achromatic color) and the maximum value (255 in the case of 8 bits), respectively. The reason why a threshold is provided on the saturation value is that when the saturation of a pixel is too low, the pixel is not sufficiently vivid and it is difficult to determine that the pixel is a color pixel. Likewise, a threshold is provided on the luminance value because the color of a pixel the luminance of which is extremely high or low is unlimitedly close to white or black and it is difficult for the human eye to discern that the pixel is a color pixel.

Subsequently, color/monochrome determination processing is performed. Also in this processing, it is determined that a color is a chromatic color by threshold processing for a value of the HSL space. When the number of chromatic color pixels and the group of chromatic color pixels are larger than certain thresholds, it is determined that the image is a color image. Also in this processing, chromatic color determination is made as in the designated color determination processing. However, the thresholds themselves vary from the designated color determination in consideration of the user-designated color.

Usually, when a user has designated no removal color, a threshold is provided only for the value of saturation S and the value of luminance L, and when the value of saturation S of a color is the threshold $T_s'$ or more and the value of luminance L of the color is greater than or equal to $T'_{L1}$ and less than or equal to $T'_{L2}$, it is determined that the color is a chromatic color. However, when a user has designated a removal color, the widths of the thresholds for color/monochrome determination are narrowed a little for the designated removal color and it is determined that the designated removal color and colors near it are achromatic colors more widely (chromatic colors more narrowly).

The reason of this is that a false color is actually generated by a color shift according to the reading device and in the case of a handwritten character by a ballpoint pen or the like, a shadow is easily caused at the edge part of the handwritten character by the unevenness of the paper made by the pen. In other words, there is a case that the center part of the handwritten character is different from the edge part of the handwritten character in color and contrast.

In order to remove a handwritten character and a ruled line with a user-designated color entirely including edges, it is, of course, necessary to give widths to the thresholds of colors around the designated color to some extent.

However, if the widths of the thresholds are widened, there is a possibility of removing portions other than the handwritten character which look like the handwritten character in color. Thus, colors around the designated color cannot help being narrowed to some extent. As a result, when removing the handwritten character, for example, the handwritten character is not entirely removed and remains partially.

Due to the handwritten character which has partially remained, there is a case that it is determined that the read image which is all monochrome excluding the handwritten character is a color image.

For this reason, the thresholds for color/monochrome determination must be generated such that it is determined that pixels for which colors around a user-designated color cannot be removed are also monochrome. In other words, when a removal color is designated by a user, the thresholds for color/monochrome determination must be modified according to the user-designated removal color in order to reduce misdetermination.

Finally, values in the HSL space are inversely converted into original RGB values. As a result, an image from which the user-designated removal color has been removed is generated and it is determined that chromatic color portions which have remained after partial removal of a handwritten character or line are monochrome.

Here, colors surrounding the designated color determined monochrome target portions failed in removal, so that the colors surrounding the designated color determined monochrome are colors in a wider range than removed colors around the designated color.

In other words, the colors surrounding the designated color include colors around colors around the designated color. For example, the colors around colors around the designated color may be two levels of color based on a two step change of the hue value, the saturation value and/or the luminance value in the HSL space.

Furthermore, although a function of removing a handwritten character and a ruled line by replacing a designated color with white is described here, threshold generation is similarly performed for a function of replacing the designated color with black.

As described above, the removal color is removed from the read image. Then, it is determined by pixel determination whether the color of each of the pixels of the read image from which the removal color has been removed is a monochrome or around-monochrome color, the removal color or a color around the removal color, or any other color. Furthermore, it is determined by the pixel determination whether the read image is a monochrome image or a color image. For example, the around-monochrome color may be a color with the saturation value of 0 and the luminance value which is larger then 0 and is smaller than 1 in the HSL space.

In the pixel determination, the removal color or, in the case of a read image from which the removal color has been removed by the removal unit, colors around the removal color of the pixels of the read image are converted so as to become a monochrome or around-monochrome color. In addition, it is determined by the pixel color determination whether the color of each of the pixels of the read image obtained by this conversion is a monochrome or around-monochrome color, or any other color.

Furthermore, the designated color and colors around the designated color are removed from the read image. Then, it is determined by the pixel determination whether the color of each of the pixels of the read image from which the designated color and colors around the designated color have been removed is a predetermined color or not. Furthermore, in the pixel determination, it is determined whether the read image is a monochrome image or a color image. The predetermined color includes white, black, and colors surrounding the designated color. In addition, colors surrounding the designated color include colors around colors around the designated color. For example, the pixel determination may be performed by comparing the hue value, the saturation value and the luminance value of the color of the pixel of the read image to that of the predetermined color.

Second Embodiment

Color Removal by Input Direct Mapping (IDM)

This embodiment reduces the number of modules removing a designated removal color by performing the operation of the color space conversion in step S302 shown in FIG. 3 in synchronization with the operation of designated color removal.

The color space conversion can be realized by a matrix operation or the like. However, color space conversion of this embodiment may be performed using a three-dimensional look-up table (LUT) of three input signals and three output signals.

Although there are combinations of about 16 million colors as colors of an image having the depth of 8 bits per one RGB color, it is difficult, when using the three-dimensional LUT, to adjust a read color difference ΔE to 0 for all the colors. For this reason, usually, the three-dimensional LUT may be generated so as to use patches with less than 16 million as samples and minimize the average read color difference ΔEave of them.

In other words, the three-dimensional LUT certainly needs an interpolation operation as long as it is not a table having entries for about 16 million colors, thus causing a quantization and interpolation error according to the size of the table. In addition, the size of the table having entries for about 16 million colors reaches as much as 500 MB. Thus, when the three-dimensional LUT is used, it is not realistic for all the colors to adjust a read color difference ΔE to 0.

An example of a three-dimensional LUT according to this embodiment is shown below. The following table shows an example of a table of 4096 entries which are thinned out in steps of 15. The outputs Ra', Ga', and Ba' to the inputs Ra, Ga, and Ba are described. For example, an output in the case that an input from a read device is (0, 0, 15) is converted to (1, 1, 14). When an input is not a value in any one of steps of 15, an output is obtained by an interpolation operation from an adjacent entry.

TABLE 1

| indx | Ra | Ga | Ba | Ra' | Ga' | Ba' |
|---|---|---|---|---|---|---|
| 0 | 0 | 0 | 0 | 0 | 0 | 0 |
| 1 | 0 | 0 | 15 | 1 | 1 | 14 |
| 2 | 0 | 0 | 30 | 2 | 1 | 27 |
| . | . | . | . | . | . | . |
| . | . | . | . | . | . | . |
| . | . | . | . | . | . | . |
| 15 | 0 | 0 | 255 | 0 | 0 | 255 |
| 16 | 0 | 15 | 0 | 1 | 13 | 3 |
| 17 | 0 | 15 | 15 | 2 | 14 | 17 |
| . | . | . | . | . | . | . |
| . | . | . | . | . | . | . |
| . | . | . | . | . | . | . |
| 4093 | 255 | 255 | 225 | 254 | 252 | 224 |
| 4094 | 255 | 255 | 240 | 254 | 252 | 238 |
| 4095 | 255 | 255 | 255 | 255 | 255 | 255 |

Removal of a designated color is realized by changing the contents of this three-dimensional LUT. In other words, by replacing a table value (Ra', Ga', Ba') in which a specific color component is stored with white (255, 255, 255) the color component after conversion disappears.

Details of the processing are described below. First, like the first embodiment, a user selects a color which the user wants to remove by the operating unit, and the color is mapped to a hue value H.

Subsequently, conversion to the HSL space is performed on Ra', Ga', and Ba' described in the three-dimensional LUT. In the case of the above table, this processing may be performed 4096 times and is thereby executed at a sufficient speed by software processing without preparing special hardware.

Subsequently, like the first embodiment, a table value converted to the HSL space is compared with thresholds, designated color is determined, and whitening is performed. When the hue value of a color is in a threshold range of a user-designated hue value $\pm T_H$, the saturation value of the color is a fixed threshold $T_S$ or more, and the luminance value of the color is greater than or equal to $T_{L1}$ and less than or equal to $T_{L2}$, it is determined that the color is a designated color. When it is determined by threshold processing that the color is the designated color, the table values Ra', Ga', and Ba' of its index are all replaced with 255.

After that, an image is read, color space conversion is performed using the three-dimensional LUT already replaced with white, and an image in which the designated color has been converted to white is obtained.

Then, like the first embodiment, color/monochrome determination is made, and spooling to a memory device is performed. This memory device may be, for example, a hard disk (HD).

In this way, a function of removing a user-designated color is provided without preparing a special image processing module, by using a color conversion three-dimensional LUT according to the second embodiment.

Third Embodiment

Removal After Spooling

In this embodiment, designated color removal is performed after image data spooling.

In the first and second embodiments, color/monochrome determination processing is performed using an image from which a designated color has been removed after removing the designated color. On the other hand, in the third embodiment, the thresholds for color/monochrome determination processing are changed according to a designated color, and thereby the order of executing designated color removal processing and color/monochrome determination processing is contrary to those of the first embodiment and the second embodiment.

When color/monochrome determination is made before performing designated color removal, it must be surely determined that a user-designated color is monochrome assuming that it will be whitened afterward. For this reason, the thresholds for chromatic color determination made at color/monochrome determination (the thresholds for color/monochrome determination processing) are changed according to the user-designated color.

By the third embodiment, when no designated color removal module is provided as image processing hardware, color/monochrome determination can be made correctly even when designated color removal is performed by software for spooled image data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-266702, filed Oct. 12, 2007, which is hereby incorporated by reference herein in its entirety.

What is claimed is:

1. An image processor comprising:
 a removal unit which for pixels of a read image that are of a removal color, replaces the pixels of the removal color with white color,
 wherein the removal color includes a designated color designated by a user and a first color having color values within a predetermined threshold around the designated color;
 a pixel determination unit for determining whether each pixel of the read image from which the pixels of the removal color have been replaced with the white color is to be treated as a color pixel or not, wherein the pixel determination unit determines that a pixel of a second color having color values within a predetermined threshold around the first color is not treated as a color pixel; and a determination unit for determining whether the read image from which the pixels of the removal color have been replaced with the white color is to be treated as a color image or not, based on the determination of the pixel determination unit.

2. An image processing method comprising:

a removal step which for pixels of a read image that are of a removal color, replacing the pixels of the removal color with white color, wherein the removal color includes a designated color designated by a user and a first color having color values within a predetermined threshold around the designated color;

a pixel determination step of determining whether each pixel of the read image from which the pixels of the removal color have been replaced with the white color is to be treated as a color pixel or not, wherein the pixel determination step determines that a pixel of a second color having color values within a predetermined threshold around the first color is not treated as a color pixel; and a determination step of determining whether the read image from which the pixels of the removal color have been replaced with the white color is to be treated as a color image or not, based on the determination in the pixel determination step.

3. The image processor according to claim 1, wherein the first color comprises a color with a saturation value of 0 and a luminance value which is larger than 0 and smaller than 1 in the HSL space.

4. The image processor according to claim 1, wherein HSL values for the first color and HSL values for the designated color are substantially the same.

5. The image processor according to claim 1, wherein HSL values for the second color and the HSL values for the first color are substantially the same.

6. The image processor method to claim 2, wherein the first color comprises a color with a saturation value of 0 and a luminance value which is larger than 0 and smaller than 1 in the HSL space.

7. The image processor method to claim 2, wherein HSL values for the first color and HSL values for the designated color are substantially the same.

8. The image processor method to claim 2, wherein HSL values for the second color and the HSL values for the first color are substantially the same.

* * * * *